Figure 1:
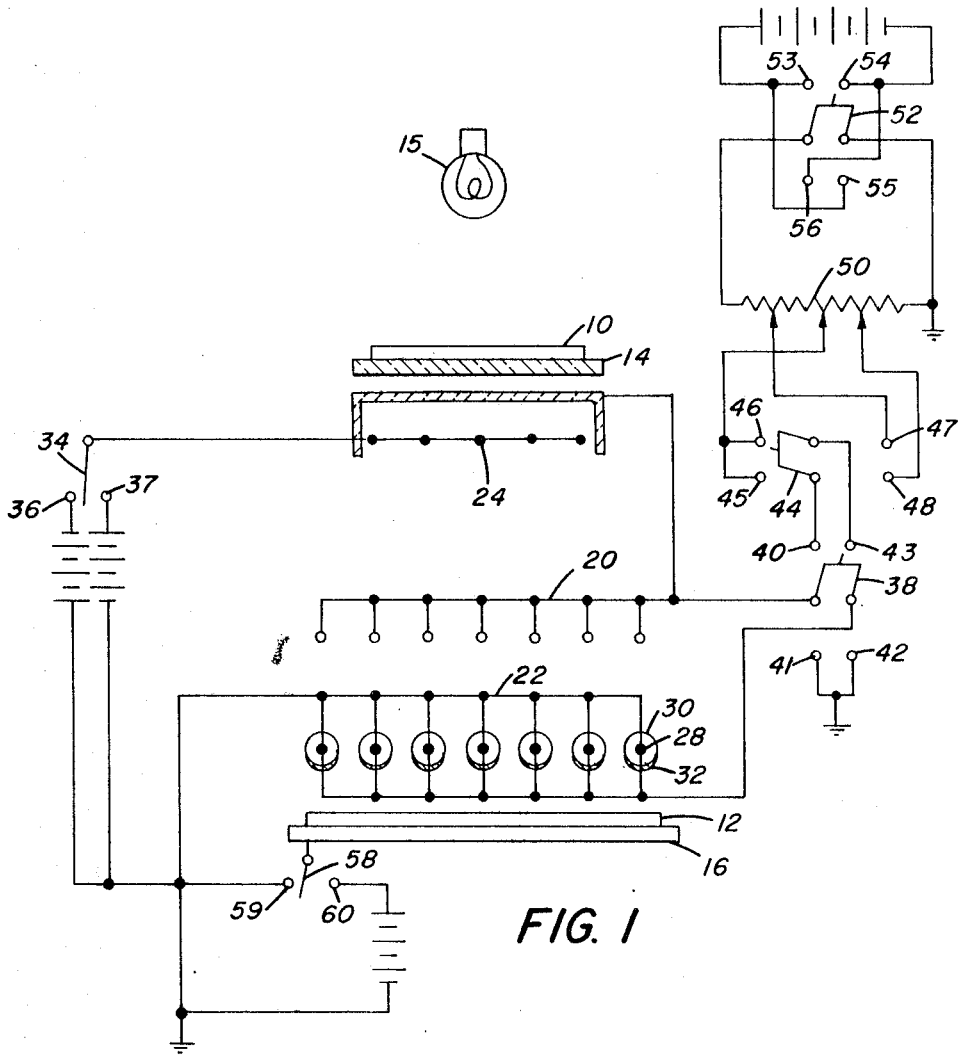
Figure 2:
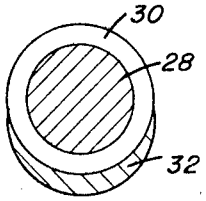

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 21, 1971

890 O.G. 979

T890,003
LATITUDE IN PHOTOCONDUCTIVELY CONTROLLED CORONA CHARGING

Joseph Y. Kaukeinen, Kodak Park Works, Rochester, N.Y. 14650

Filed May 4, 1970, Ser. No. 34,286
Int. Cl. G03g *13/00*
U.S. Cl. 250—49.52C
1 Sheet Drawing. 12 Pages Specification

A metal coating is applied to one side of the photoconductor coated grid used to control corona charging. The coating is applied to the side which is not directly exposed to the incident radiation and serves to reduce dis-

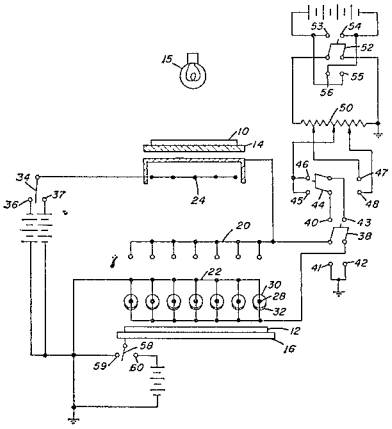

charge of the photoconductor coated grid caused by reflection of diffuse radiation from the copy receiving sheet.

Sept. 21, 1971 J. Y. KAUKEINEN T890,003

LATITUDE IN PHOTOCONDUCTIVELY CONTROLLED CORONA CHARGING

Filed May 4, 1970

JOSEPH Y. KAUKEINEN
INVENTOR.

BY J. Wm. Berkstresser

ATTORNEY